UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

CAOUTCHOUC-LIKE SUBSTANCES AND PROCESS OF MAKING THEM.

1,192,310.      Specification of Letters Patent.      Patented July 25, 1916.

No Drawing.      Application filed July 30, 1913. Serial No. 782,028.

*To all whom it may concern:*

Be it known that I, HENRY STALAY ARTHUR HOLT, Ph. D., citizen of the British Empire, residing at Ludwigshafen-on-the-Rhine, Germany, have invented new and useful Improvements in Caoutchouc-Like Substances and Process of Making Them, of which the following is a specification.

It is known that butadiene and its homologues can be polymerized by allowing them to stand at ordinary temperature with a metal such, for instance, as sodium. The polymer obtained is soluble in the butadiene used and the first sign of change is that the liquid becomes viscous and the viscosity increases as the reaction proceeds.

I have found that quite a different reaction takes place if a butadiene hydrocarbon, under which term I include butadiene and homologues thereof, be treated with sodium or the like in the presence of carbon dioxid, the product obtained being insoluble in the butadiene hydrocarbon and the initial hydrocarbon remaining limpid till the whole is changed into the new body.

The treatment of the butadiene hydrocarbon with the alkali metal in the presence of carbon dioxid can be carried out in various manners, without departing from my invention. For instance, either a single metal such as sodium may be employed, or mixtures of the alkali metals with one another or with other metals can be employed, and in some cases, an advantage is secured by using such mixture. In this specification I include alloys under the term mixtures. It is also often advantageous to make use of the alkali metal in the presence of a solid body, for instance the hydrocarbon may be shaken with the alkali metal in the presence of carbon dioxid and of balls of zinc, glass, clay, porcelain and quartz. In some cases, for instance, when the butadiene hydrocarbon, alkali metal and carbon dioxid are allowed to stand together, a dark colored product is obtained, which I regard as the polymerized product mixed with finely divided alkali metal. This dark colored product can also be employed instead of taking fresh alkali metal, in order to bring about polymerization of further quantities of butadiene hydrocarbon in the presence of carbon dioxid according to my invention. In this way, large quantities of compounds resembling or related to caoutchouc can be obtained with the use of very little sodium or the like.

If the reaction be carried out at a raised temperature, the velocity thereof is often accelerated.

My new products are characterized by being white substances, which are insoluble in isoprene, are insoluble in benzene and do not swell when placed therein, and contain at least 88.15% carbon.

The following examples will serve to illustrate further the nature of my invention and how it can be carried into practical effect, but the invention is not confined to these examples. The parts are by weight.

Example 1: Shake together, at ordinary temperature, one hundred parts of 2.3-dimethyl-1:3-butadiene and five parts of sodium wire in a vessel filled with a dry carbon dioxid. After from two, to three, days the sodium, which has broken up into short pieces, appears to swell and after another three to seven days the dimethyl-butadiene is practically quantitatively converted into a voluminous black mass without having passed through a viscous stage. On treating this black mass with water, or alcohol, it rapidly becomes pure white and can be purified from alkali by washing with water. The process differs from that which takes place when the treatment is carried out in the absence of carbon dioxid, as, in the latter case, a reduction of volume takes place and the liquid grows continually more viscous and a different product is obtained.

Example 2: Place one hundred parts of isoprene with five parts of sodium, in the form of wire, in a capacious vessel which is otherwise filled with carbon dioxid, and then shake the vessel. After about fourteen to twenty days, the sodium, which is covered with a black layer, appears to swell and, after a time, a voluminous black mass is obtained without the isoprene passing through a viscous stage. Introduce this mass into alcohol, whereupon it becomes white, and then wash it with water until it is free from alkali. It is practically insoluble in benzene and isoprene. If the process described in this example be carried out at a temperature of from forty to fifty degrees centigrade, the reaction proceeds more quickly and is complete in, say, about ten days.

Example 3: Pour five hundred parts of 2.3-dimethyl-1.3-butadiene over one hundred parts of the black polymerization product obtained according to the foregoing Example 1 and allow the mass to stand in an atmosphere of carbon dioxid, until the liquid has disappeared.

Example 4: Polymerize one hundred parts of 2.3-dimethyl-1.3-butadiene with five parts of sodium in a vessel filled with dry carbon dioxid, as described in the foregoing Example 1, then add from five hundred to six hundred parts of fresh dry 2.3-dimethyl-1.3-butadiene and allow the mass to stand, in an atmosphere of carbon dioxid, for from five to six days, when the liquid will have disappeared and the whole have become converted into a voluminous black mass. Repeat the addition of fresh 2.3-dimethyl-1.3-butadiene once, or several times, as long as the reaction mass is of a dark color.

Example 5: Place one hundred parts of 2.3-dimethyl-1.3-butadiene, five parts of fine sodium wire and five parts of iron filings in a vessel and drive out the air by means of carbon dioxid. Then close the vessel and shake it for from three to seven days until the whole mass is converted into a black voluminous product. This can be freed from alkali metal by introducing it into water, alcohol or the like, while at the same time part of the iron is separated mechanically. The remaining iron can be dissolved away by treatment with hydrochloric acid. In a similar manner, other metals, such for instance as zinc, tin, lead, and nickel, can be employed, and other hydrocarbons of the butadiene series can be polymerized.

Example 6: Shake, for a few days, one hundred parts of 2.3-dimethyl-1.3-butadiene with a quantity of liquid, or finely powdered solid, sodium amalgam containing about two parts of sodium, in a vessel, having first replaced the air by an atmosphere of carbon dioxid. When the mass has become black and solid, introduce it into water and separate the product, which has turned white, from the mercury by means of centrifugal action. In a similar manner, other sodium alloys, such for example as leadsodium, can be employed, and other hydrocarbons of the butadiene series can be polymerized.

In the foregoing examples, sodium can be replaced by potassium and similar products can be obtained from butadiene, or homologues thereof, such for example as the hexadienes, for instance 2-ethyl-1.3-butadiene.

If desired, the dark colored product obtained from any one of the aforesaid hydrocarbons can be employed for polymerization of any other of them.

Example 7: Grind together, in a porcelain ball mill, in which the air has been replaced by carbon dioxid, one hundred parts of isoprene and five parts of metallic sodium, until a dry mass is obtained. Ordinary temperature may be employed, or the reaction may be carried out at a moderately raised temperature. The light gray product, which is permeated with finely divided glistening sodium, can be employed for polymerizing a further quantity of isoprene, or it can be introduced into water in order to free it from alkali metal and then be separated from the porcelain balls and dried.

Now what I claim is:

1. The process of producing substances resembling or related to caoutchouc by treating a hydrocarbon of the butadiene series with an alkali metal in the presence of carbon dioxid.

2. The process of producing substances resembling or related to caoutchouc by treating a hydrocarbon of the butadiene series with an alkali metal in the presence of carbon dioxid at a raised temperature.

3. The process of producing substances resembling or related to caoutchouc by treating a hydrocarbon of the butadiene series with an alkali metal in the presence of carbon dioxid and of a suitable solid body.

4. The process of producing substances resembling or related to caoutchouc by shaking a butadiene hydrocarbon with an alkali metal and zinc balls in the presence of carbon dioxid.

5. The process of producing substances resembling or related to caoutchouc by treating a butadiene hydrocarbon with an alkali metal in the presence of carbon dioxid, and then, when a dark colored mass has been obtained, adding a further quantity of butadiene hydrocarbon, and allowing polymerization to proceed, also in the presence of carbon dioxid.

6. The sub-process of producing substances resembling or related to caoutchouc by treating a butadiene hydrocarbon in the presence of carbon dioxid with the dark colored substance produced by acting on a butadiene hydrocarbon with an alkali metal in the presence of carbon dioxid.

7. The process of producing substances resembling or related to caoutchouc by treating a butadiene hydrocarbon in the presence of carbon dioxid with a mixture of an alkali metal with another metal.

8. The new substances resembling or related to caoutchouc which can be obtained by treating a butadiene hydrocarbon with alkali metal in the presence of carbon dioxid, which new substances are white and insoluble in isoprene, are insoluble in benzene and do not swell when placed therein and contain at least 88.15% carbon.

9. The new substance resembling or related to caoutchouc which can be obtained by treating isoprene with sodium in the presence of carbon dioxid, which new substance is white and insoluble in isoprene, is insoluble in benzene and does not swell when placed therein, and contains practically 88.15% carbon.

In testimony whereof I have hereunto set my hand in the presence of two subscribing witnesses.

HENRY STALAY ARTHUR HOLT.

Witnesses:
  J. ALEC. LLOYD,
  JOSEPH PFEIFFER.